US011964638B2

(12) United States Patent
Fairchild (10) Patent No.: US 11,964,638 B2
(45) Date of Patent: Apr. 23, 2024

(54) AUTOMATIC VEHICLE JACK ASSEMBLY

(71) Applicant: Delbert Fairchild, Exeter, CA (US)

(72) Inventor: Delbert Fairchild, Exeter, CA (US)

( * ) Notice: Subject to any disclaimer, the term of this patent is extended or adjusted under 35 U.S.C. 154(b) by 371 days.

(21) Appl. No.: 17/361,562

(22) Filed: Jun. 29, 2021

(65) Prior Publication Data
US 2022/0410850 A1  Dec. 29, 2022

(51) Int. Cl.
| | |
|---|---|
| *B60S 9/06* | (2006.01) |
| *B60R 16/023* | (2006.01) |
| *B60S 9/00* | (2006.01) |
| *B60S 9/02* | (2006.01) |
| *B66F 3/44* | (2006.01) |
| *B66F 3/46* | (2006.01) |
| *B66F 7/06* | (2006.01) |
| *B66F 7/28* | (2006.01) |
| *B60S 9/12* | (2006.01) |

(52) U.S. Cl.
CPC .............. *B60S 9/06* (2013.01); *B60R 16/023* (2013.01); *B60S 9/00* (2013.01); *B60S 9/02* (2013.01); *B66F 3/44* (2013.01); *B66F 3/46* (2013.01); *B66F 7/065* (2013.01); *B60S 9/12* (2013.01); *B66F 7/28* (2013.01)

(58) Field of Classification Search
CPC ...... B60S 9/12; B60S 9/06; B60S 9/00; B60S 9/02; B66F 7/28; B66F 3/46; B66F 3/12; B66F 3/44; B66F 7/065; B60B 2340/70; B60B 2900/551; B60R 16/023; B60D 1/06
USPC ............................................. 254/93 VA, 424
See application file for complete search history.

(56) References Cited

U.S. PATENT DOCUMENTS

| | | | | |
|---|---|---|---|---|
| 1,545,223 | A | * | 7/1925 | Westrate ................... B66F 3/22 187/269 |
| 2,047,484 | A | * | 7/1936 | McBrady .................. B66F 3/12 254/126 |
| 2,204,997 | A | | 6/1940 | Ostruk |
| 3,292,902 | A | * | 12/1966 | Lynch ....................... B66F 3/12 254/122 |
| 3,888,464 | A | | 6/1975 | Felsen |
| 6,237,953 | B1 | | 5/2001 | Farmer |
| 8,424,848 | B1 | | 4/2013 | Hawkins, Jr. |
| 9,963,123 | B2 | * | 5/2018 | Dominguez ......... B62D 43/002 |
| 10,233,062 | B2 | * | 3/2019 | Cheng ................... B66F 7/0625 |

(Continued)

FOREIGN PATENT DOCUMENTS

| | | | | |
|---|---|---|---|---|
| CA | 3112025 A1 | * | 9/2021 | ............... B60D 1/66 |
| WO | WO-9940262 A1 | * | 8/1999 | ............ B66F 7/0608 |
| WO | WO2016160392 | | 10/2016 | |

*Primary Examiner* — Mahdi H Nejad (57) ABSTRACT

An automatic vehicle jack assembly includes a plurality of scissor jacks that is each mounted to a bottom side of a vehicle. Each of the scissor jacks is positioned adjacent to a respective one of a plurality of wheels on the vehicle for lifting the respective wheel upwardly from a support surface. Conversely, each of the scissor jacks is actuatable into a retracted position thereby facilitating the respective wheel to roll along the support surface. A control panel is positioned within a cab of the vehicle such that the control panel is accessible to a driver of the vehicle. The control panel is in communication with each of the scissor jacks thereby facilitating the control panel to independently or simultaneously actuate each of the scissor jacks between the extended position or the retracted position.

8 Claims, 5 Drawing Sheets

(56) References Cited

U.S. PATENT DOCUMENTS

| | | | |
|---|---|---|---|
| 2011/0001098 A1* | 1/2011 | Lee | B66F 3/12 |
| | | | 187/269 |
| 2014/0217342 A1* | 8/2014 | Dondurur | B60S 9/12 |
| | | | 254/423 |
| 2016/0264106 A1 | 9/2016 | Pierre | |
| 2017/0362068 A1* | 12/2017 | Cheng | B66F 7/28 |
| 2020/0407206 A1* | 12/2020 | Bowers | B66F 3/46 |
| 2021/0061627 A1* | 3/2021 | Cowden | B66F 7/065 |
| 2021/0292141 A1* | 9/2021 | Resendiz | B66F 3/46 |

\* cited by examiner

AUTOMATIC VEHICLE JACK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle jack devices and more particularly pertains to a new vehicle jack device for automatically lifting a vehicle on a support surface. The device includes a plurality of scissor jacks that are each positioned adjacent to a respective wheel on the vehicle. In this way each of the scissor jacks can either independently or simultaneously lift the respective wheel for performing service on the vehicle.

(2) Description of Related Art Including Information Disclosed Under 37 CFR 1.97 and 1.98

The prior art relates to vehicle jack devices including an automatic vehicle jack device that includes a pair of scissor jacks that are each centrally positioned on opposite sides of a vehicle for lifting or lowering a passenger side or a driver's side of the vehicle. The prior art also discloses a variety of automatic vehicle jack devices that include powered jacks, none of which comprise a scissor jack, for lifting and lowering a vehicle. In no instance does the prior art disclose an automatic vehicle jack device that includes a plurality of scissor jacks that are each aligned with a respective wheel of a vehicle.

BRIEF SUMMARY OF THE INVENTION

An embodiment of the disclosure meets the needs presented above by generally comprising a plurality of scissor jacks that is each mounted to a bottom side of a vehicle. Each of the scissor jacks is positioned adjacent to a respective one of a plurality of wheels on the vehicle for lifting the respective wheel upwardly from a support surface. Conversely, each of the scissor jacks is actuatable into a retracted position thereby facilitating the respective wheel to roll along the support surface. A control panel is positioned within a cab of the vehicle such that the control panel is accessible to a driver of the vehicle. The control panel is in communication with each of the scissor jacks thereby facilitating the control panel to independently or simultaneously actuate each of the scissor jacks between the extended position or the retracted position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new vehicle jack device embodying the principles and concepts of an embodiment of the disclosure and generally designated by the reference numeral 10 will be described.

As best illustrated in FIGS. 1 through 6, the automatic vehicle jack assembly 10 generally comprises a plurality of scissor jacks 12 that is each mounted to a bottom side 14 of a vehicle 16. The vehicle 16 may be a passenger vehicle, a cargo vehicle or any other type of motorized vehicle that is driven on public roadways. Each of the scissor jacks 12 is positioned adjacent to a respective one of a plurality of wheels 18 on the vehicle 16 for lifting the respective wheel 18 upwardly from a support surface 20, such as a roadway for example, when the scissor jack 12 aligned with the respective wheel 18 is actuated into an extended position. Conversely, each of the scissor jacks 12 is actuatable into a retracted position thereby facilitating the respective wheel 18 to roll along the support surface 20.

Figure 1:
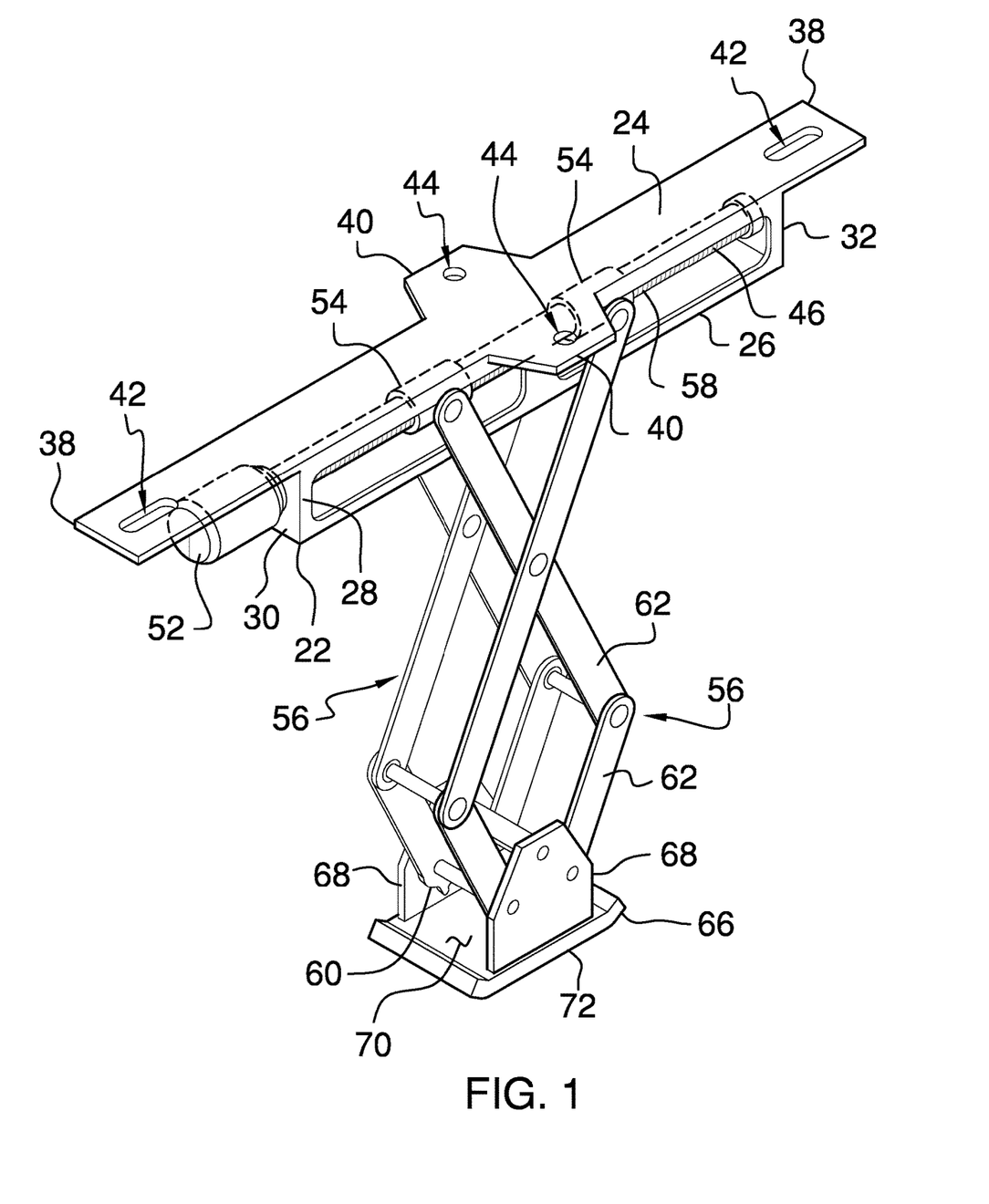
FIG. 1 is a perspective view of a scissor jack of an automatic vehicle jack assembly according to an embodiment of the disclosure.
Figure 2:
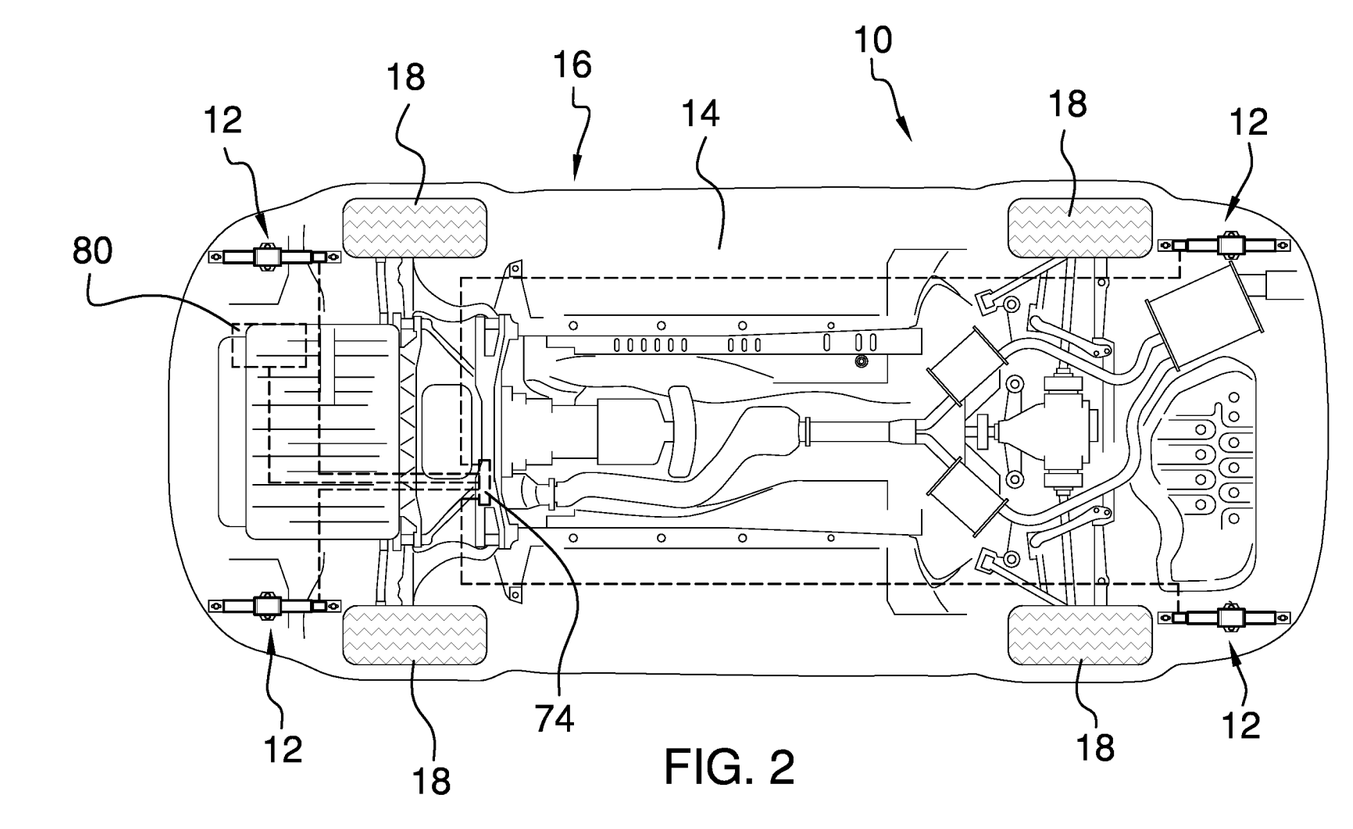
FIG. 2 is a bottom phantom view of an embodiment of the disclosure.

Each of the scissor jacks 12 comprises a housing 22 has a top wall 24, a bottom wall 26 and an outer wall 28 extending between the top wall 24 and the bottom wall 26, and the outer wall 28 has a front side 30, a back side 32, a first lateral side 34 and a second lateral side 36. The housing 22 is elongated between the front side 30 and the back side 32, and each of the first lateral side 34 and the second lateral side 36 of the outer wall 28 is substantially open into an interior of the housing 22. The top wall 24 has a pair of first tabs 38 each extending outwardly beyond a respective one of the front side 30 and the back side 32 of the outer wall 28. The top wall 24 has a pair of second tabs 40 each extending outwardly beyond a respective one of the first lateral side 34 and the second lateral side 36 of the outer wall 28. Each of the second tabs 40 is centrally positioned between the front side 30 and the back side 32. Each of the first tabs 38 has mounting holes 42 extending through the first tabs 38, and each of the second tabs 40 has mounting holes 44 extending through the second tabs 40. The top wall 24 of the housing 22 abuts the bottom side 14 of the vehicle 16 and fasteners, such as bolts, screws or other type of releasable, mechanical fastener, are extendable through the mounting holes 42, 44 in each of the first tabs 38 and each of the second tabs 40 for fastening the housing 22 to the bottom side 14 of the vehicle 16.

Each of the scissor jacks 12 includes a screw 46 that is rotatably positioned within the housing 22. The screw 46 has a first end 48 rotatably engaging the front side 30 of the outer wall 28, and the screw 46 has a second end 50 rotatably engaging the back side 32. Each of the scissor jacks 12 includes a motor 52 that is coupled to the front side 30 of the outer wall 28 of the housing 22. The motor 52 engages the first end 48 of the screw 46 and the motor 52 is actuatable to rotate the screw 46 in a first direction or a second direction. Additionally, the motor 52 may be an electric motor of the like.

Each of the scissor jacks 12 includes a pair of sleeves 54 the screw 46 extends through each of the sleeves 54 such that each of the sleeves 54 threadably engages the screw 46. Each of the sleeves 54 travels toward a respective one of the first end 48 and the second end 50 of the screw 46 when the motor 52 rotates in the first direction. Conversely, each of the sleeves 54 travels away from the respective first end 48 and second end 50 of the screw 46 when the motor 52 rotates in the second direction.

Figure 4:
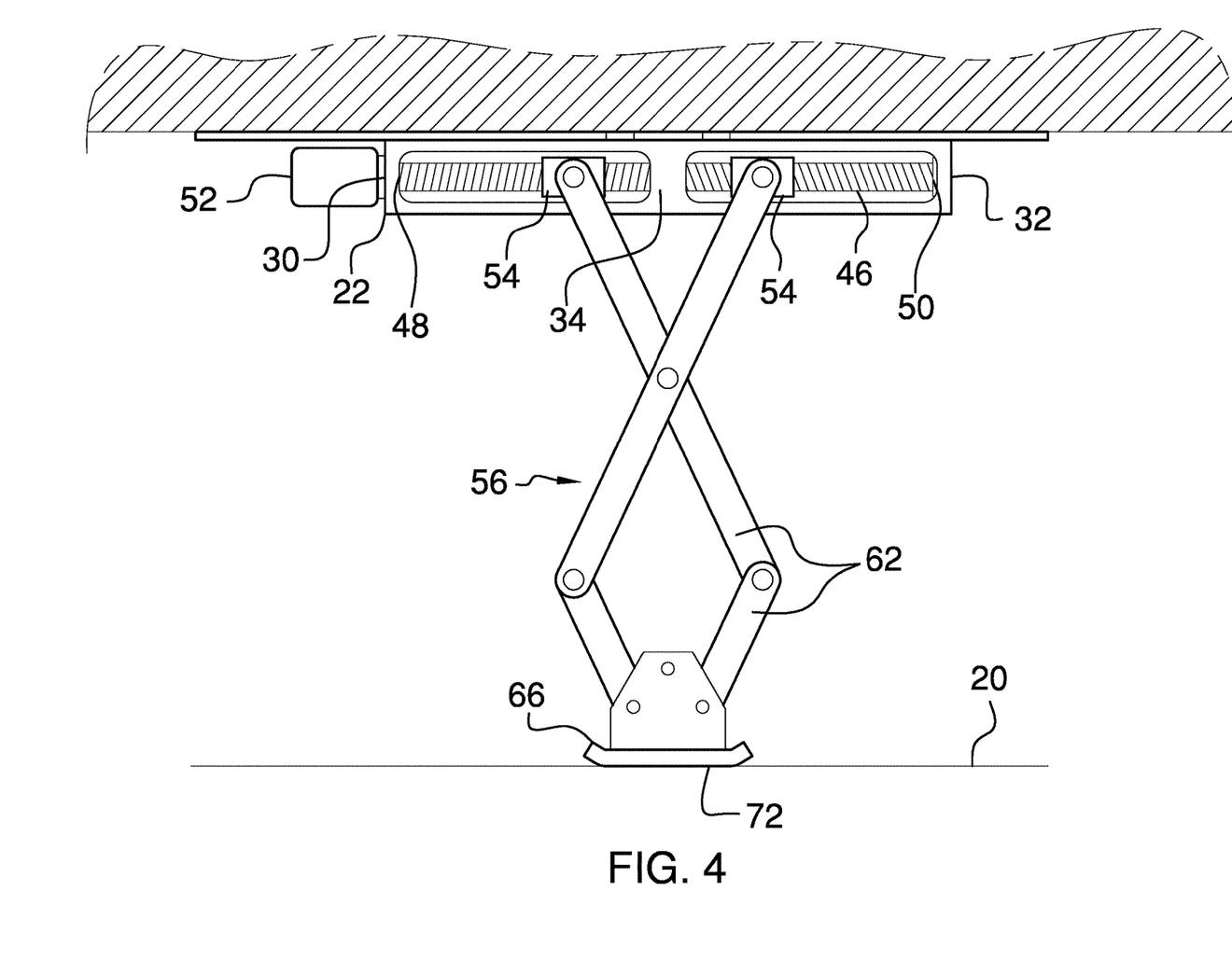
FIG. 4 is a left side view of a scissor jack of an embodiment of the disclosure showing the scissor jack in an extended position.
Figure 5:
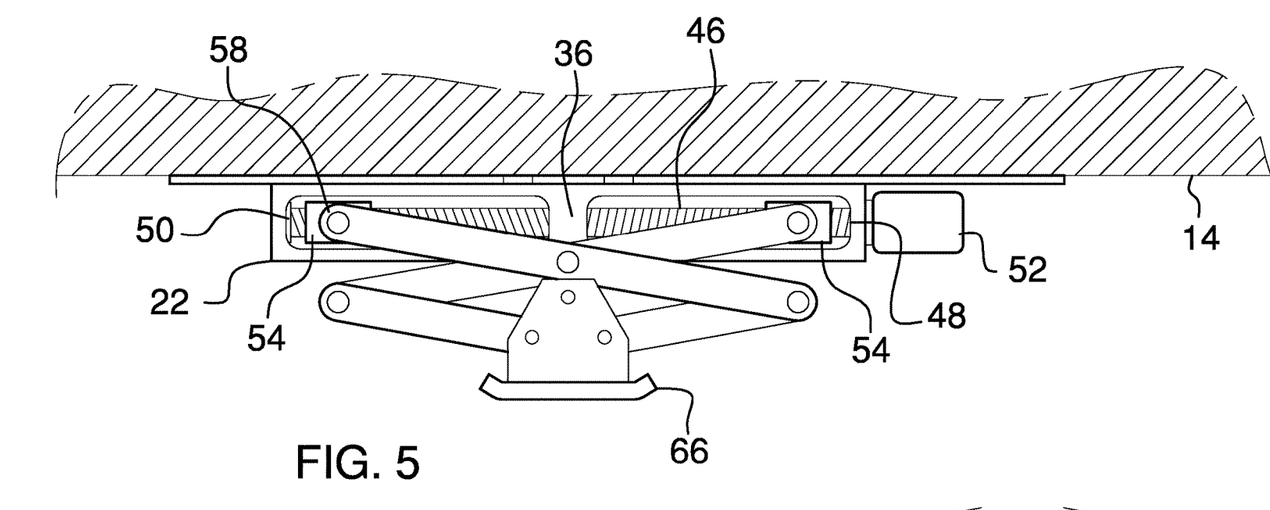
FIG. 5 is a right side view of a scissor jack of an embodiment of the disclosure showing the scissor jack in a retracted position.

Each of the scissor jacks 12 includes a pair of scissors 56 that each has an upper end 58 and a lower end 60, and each of the scissors 56 pivotally engages each other. The upper end 58 of each of the scissors 56 pivotally engages a respective one of the sleeves 54. Each of the scissors 56 is collapsed when the motor 52 rotates the screw 46 in the first direction such that the lower end 60 of the scissors 56 is positioned adjacent to the bottom wall 26 of the housing 22. Conversely, each of the scissors 56 is extended when the motor 52 rotates the screw 46 in the second direction such that the lower end 60 of the scissors 56 is spaced downwardly from the bottom wall 26 of the housing 22. Each of the scissors 56 might include a plurality of members 62 that are pivotally coupled together such that each of the scissors 56 forms a lattice.

Figure 6:
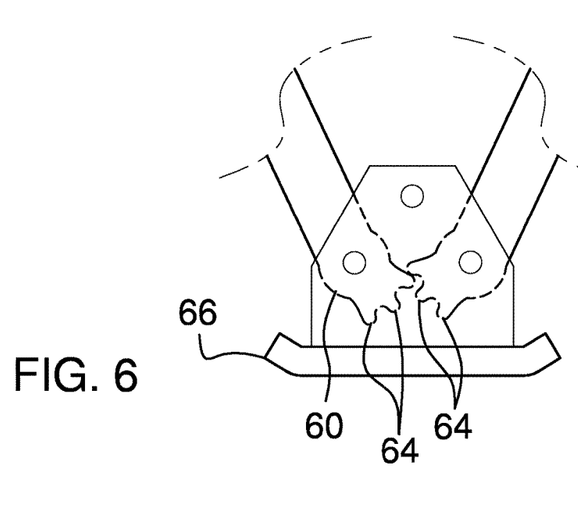
FIG. 6 is a detail phantom view of a foot and a lower end of a pair of scissors of an embodiment of the disclosure.

The lower end 60 of each of the scissors 56 has a plurality of lobes 64 each extending away from the lower end 60. The lobes 64 on each of the scissors 56 are spaced apart from each other and are distributed around a substantial circumference of the lower end 60 of the respective scissor. Moreover, the lobes 64 on the lower end 60 of each of the scissors 56 are positioned between respective lobes 64 on the lower end 60 of a respective one of the scissors 56 when the scissors 56 are extended and retracted. In this way the scissors 56 are retained at a degree of extension or retraction when the motor 52 is turned off. Thus, the scissor jacks 12 can keep the vehicle 16 lifted when the motor 52 in the scissor jacks 12 is turned off.

Each of the scissor jacks 12 includes a foot 66 that has a pair of panels 68 each extending upwardly from a top surface 70 of the foot 66, and the panels 68 are spaced apart from each other. The lower end 60 of each of the scissors 56 is positioned between each of the panels 68, and the lower end 60 of each of the scissors 56 pivotally engages a respective one of the panels 68. A bottom surface 72 of the foot 66 abuts the support surface 20 when the scissors 56 are extended to facilitate the scissors 56 to lift the vehicle 16 upwardly from the support surface 20.

Figure 3:
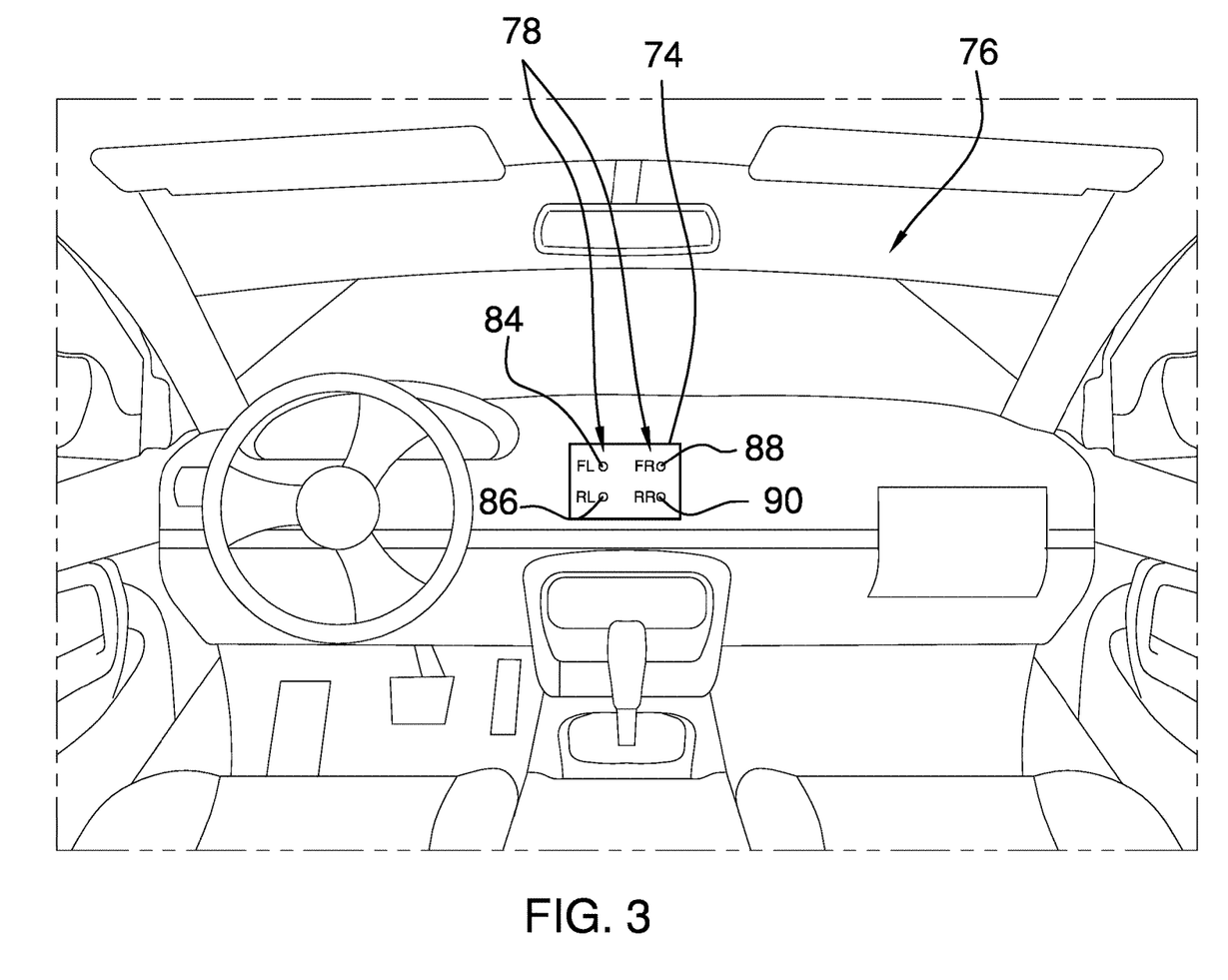
FIG. 3 is an interior view of a cab of a vehicle of an embodiment of the disclosure.

A control panel 74 is positioned within a cab 76 of the vehicle 16 such that the control panel 74 is accessible to a driver of the vehicle 16 and the control panel 74 is in communication with each of the scissor jacks 12. Additionally, the control panel 74 can independently or simultaneously actuate each of the scissor jacks 12 between the extended position or the retracted position. The control panel 74 includes a plurality of control buttons 78 that is each movably integrated into the control panel 74. Each of the control buttons 78 is electrically coupled to the motor 52 of a respective one of the scissor jacks 12. Each of the control buttons 78 can actuate the motor 52 in the respective scissor jack 12 to rotate the screw 46 in the respective scissor jack 12 in either the first direction or the second direction for lifting or lowering the vehicle 16. The control panel 74 is electrically coupled to a power source 80 comprising an electrical system 82 of the vehicle 16. The plurality of control buttons 78 may include a left front button 84, a left rear button 86, a right front button 88 and a right rear button 90 to correspond to the location of each of the scissor jacks 12 on the vehicle 16.

In use, a respective one of the control buttons 78 is manipulated to actuate the respective scissor jack into the extended position to lift the respective wheel 18 upwardly from the support surface 20. In this way the respective wheel 18 can be replaced when the respective wheel 18 is flat, for example. Additionally, each of the scissor jacks 12 can be actuated into the extended position to lift the entire vehicle 16 upwardly from the support surface 20. In this way a physically limited user, for example, can easily lift the vehicle 16 to perform service that would otherwise be difficult or impossible for the physically limited user to perform.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automatic vehicle jack assembly for automatically lifting a vehicle for performing service on the vehicle, said assembly comprising:
    a plurality of scissor jacks, each of said scissor jacks being mounted to a bottom side of the vehicle, each of said scissor jacks being positioned adjacent to a respective one of a plurality of wheels on the vehicle for lifting the respective wheel upwardly from a support surface when each of said scissor jacks aligned with the respective wheel is actuated into an extended position, each of said scissor jacks being actuatable into a retracted position thereby facilitating the respective wheel to roll along the support surface; and
    a control panel being positioned within a cab of the vehicle wherein said control panel is configured to be accessible to a driver of the vehicle, said control panel being in communication with each of said scissor jacks thereby facilitating said control panel to independently or simultaneously actuate each of said scissor jacks between said extended position or said retracted position;
    wherein each of said scissor jacks comprises a housing having a top wall, a bottom wall and an outer wall extending between said top wall and said bottom wall, said outer wall having a front side, a back side, a first lateral side and a second lateral side, said housing being elongated between said front side and said back side, each of said first lateral side and said second lateral side of said outer wall being substantially open into an interior of said housing;
    wherein said top wall having a pair of first tabs each extending outwardly beyond a respective one of said front side and said back side of said outer wall, each of said first tabs having mounting holes extending through said first tabs;
    wherein said top wall having a pair of second tabs each extending outwardly beyond a respective one of said first lateral side and said second lateral side of said outer wall, each of said second tabs being centrally positioned between said front side and said back side, each of said second tabs having mounting holes extending through said second tabs; and
    wherein said top wall abuts the bottom side of the vehicle having fasteners extending through said mounting holes in each of said first tabs and each of said second tabs for fastening said housing to the bottom side of the vehicle.

2. The assembly according to claim 1, wherein each of said scissor jacks includes:
    a screw being rotatably positioned within said housing, said screw having a first end rotatably engaging said front side of said outer wall, said screw having a second end rotatably engaging said back side; and
    a motor being coupled to said front side of said outer wall of said housing, said motor engaging said first end of said screw, said motor being actuatable to rotate said screw in a first direction or a second direction.

3. The assembly according to claim 2, wherein each of said scissor jacks includes a pair of sleeves, each of said sleeves having said screw extending through said sleeves such that each of said sleeves threadably engages said screw, each of said sleeves travelling toward a respective one of said first end and said second end of said screw when said motor rotates in said first direction, each of said sleeves travelling away from said respective first end and second end of said screw when said motor rotates in said second direction.

4. The assembly according to claim 3, wherein each of said scissor jacks includes a pair of scissors, each of said scissors having an upper end and a lower end, each of said scissors pivotally engaging each other, said upper end of each of said scissors pivotally engaging a respective one of said sleeves, each of said scissors being collapsed when said motor rotates said screw in said first direction such that said lower end of said scissors is positioned adjacent to said bottom wall of said housing, each of said scissors being extended when said motor rotates said screw in said second direction such that said lower end of said scissors is spaced downwardly from said bottom wall of said housing.

5. The assembly according to claim 4, wherein said lower end of each of said scissors having a plurality of lobes each extending away from said lower end, said lobes on a respective one of said scissors being spaced apart from each other and being distributed around a substantial circumference of said lower end of said respective scissor, said lobes on said lower end of each of said scissors being positioned between respective lobes on said lower end of a respective one of said scissors when said scissors are extended and retracted to retain said scissors at a degree of extension or retraction when said motor is turned off.

6. The assembly according to claim 4, wherein each of said scissor jacks includes a foot having a pair of panels each extending upwardly from a top surface of said foot, said panels being spaced apart from each other, said lower end of each of said scissors being positioned between each of said panels, said lower end of each of said scissors pivotally engaging a respective one of said panels, a bottom surface of said foot abutting the support surface when said scissors are extended wherein said foot is configured to facilitate said scissors to lift the vehicle upwardly from the support surface.

7. The assembly according to claim 2, wherein said control panel includes a plurality of control buttons being movably integrated therein, each of said control buttons being electrically coupled to said motor of a respective one of said scissor jacks for actuating said motor in said respective scissor jack to rotate said screw in said respective scissor jack in either said first direction or said second direction for lifting or lowering the vehicle, said control panel being electrically coupled to a power source comprising an electrical system of the vehicle.

8. An automatic vehicle jack assembly for automatically lifting a vehicle for performing service on the vehicle, said assembly comprising:
    a plurality of scissor jacks, each of said scissor jacks being mounted to a bottom side of the vehicle, each of said scissor jacks being positioned adjacent to a respective one of a plurality of wheels on the vehicle for lifting the respective wheel upwardly from a support surface when each of said scissor jacks aligned with the respective wheel is actuated into an extended position, each of said scissor jacks being actuatable into a retracted position thereby facilitating the respective wheel to roll along the support surface, each of said scissor jacks comprising:
        a housing having a top wall, a bottom wall and an outer wall extending between said top wall and said bottom wall, said outer wall having a front side, a back side, a first lateral side and a second lateral side, said housing being elongated between said front side and said back side, each of said first lateral side and said second lateral side of said outer wall being substantially open into an interior of said housing, said top wall having a pair of first tabs each extending outwardly beyond a respective one of said front side and said back side of said outer wall, said top wall having a pair of second tabs each extending outwardly beyond a respective one of said first lateral side and said second lateral side of said outer wall, each of said second tabs being centrally positioned between said front side and said back side, each of said first tabs having mounting holes extending through said first tabs, each of said second tabs having mounting holes extending through said second tabs, said top wall abutting the bottom side of the vehicle having fasteners extending through said mounting holes in each of said first tabs and each of said second tabs for fastening said housing to the bottom side of the vehicle;

a screw being rotatably positioned within said housing, said screw having a first end rotatably engaging said front side of said outer wall, said screw having a second end rotatably engaging said back side;

a motor being coupled to said front side of said outer wall of said housing, said motor engaging said first end of said screw, said motor being actuatable to rotate said screw in a first direction or a second direction;

a pair of sleeves, each of said sleeves having said screw extending therethrough such that each of said sleeves threadably engages said screw, each of said sleeves travelling toward a respective one of said first end and said second end of said screw when said motor rotates in said first direction, each of said sleeves travelling away from said respective first end and second end of said screw when said motor rotates in said second direction;

a pair of scissors, each of said scissors having an upper end and a lower end, each of said scissors pivotally engaging each other, said upper end of each of said scissors pivotally engaging a respective one of said sleeves, each of said scissors being collapsed when said motor rotates said screw in said first direction such that said lower end of said scissors is positioned adjacent to said bottom wall of said housing, each of said scissors being extended when said motor rotates said screw in said second direction such that said lower end of said scissors is spaced downwardly from said bottom wall of said housing, said lower end of each of said scissors having a plurality of lobes each extending away from said lower end, said lobes on a respective one of said scissors being spaced apart from each other and being distributed around a substantial circumference of said lower end of said respective scissor, said lobes on said lower end of each of said scissors being positioned between respective lobes on said lower end of a respective one of said scissors when said scissors are extended and retracted to retain said scissors at a degree of extension or retraction when said motor is turned off; and a foot having a pair of panels each extending upwardly from a top surface of said foot, said panels being spaced apart from each other, said lower end of each of said scissors being positioned between each of said panels, said lower end of each of said scissors pivotally engaging a respective one of said panels, a bottom surface of said foot abutting the support surface when said scissors are extended wherein said foot is configured to facilitate said scissors to lift the vehicle upwardly from the support surface; and a control panel being positioned within a cab of the vehicle wherein said control panel is configured to be accessible to a driver of the vehicle, said control panel being in communication with each of said scissor jacks thereby facilitating said control panel to independently or simultaneously actuate each of said scissor jacks between said extended position or said retracted position, said control panel including a plurality of control buttons being movably integrated therein, each of said control buttons being electrically coupled to said motor of a respective one of said scissor jacks for actuating said motor in said respective scissor jack to rotate said screw in said respective scissor jack in either said first direction or said second direction for lifting or lowering the vehicle, said control panel being electrically coupled to a power source comprising an electrical system of the vehicle.

\* \* \* \* \*